April 28, 1953 H. J. ATKINSON 2,636,812
FEEDER FOR SOLID AND LIQUID CONSTITUENTS
Filed July 12, 1952
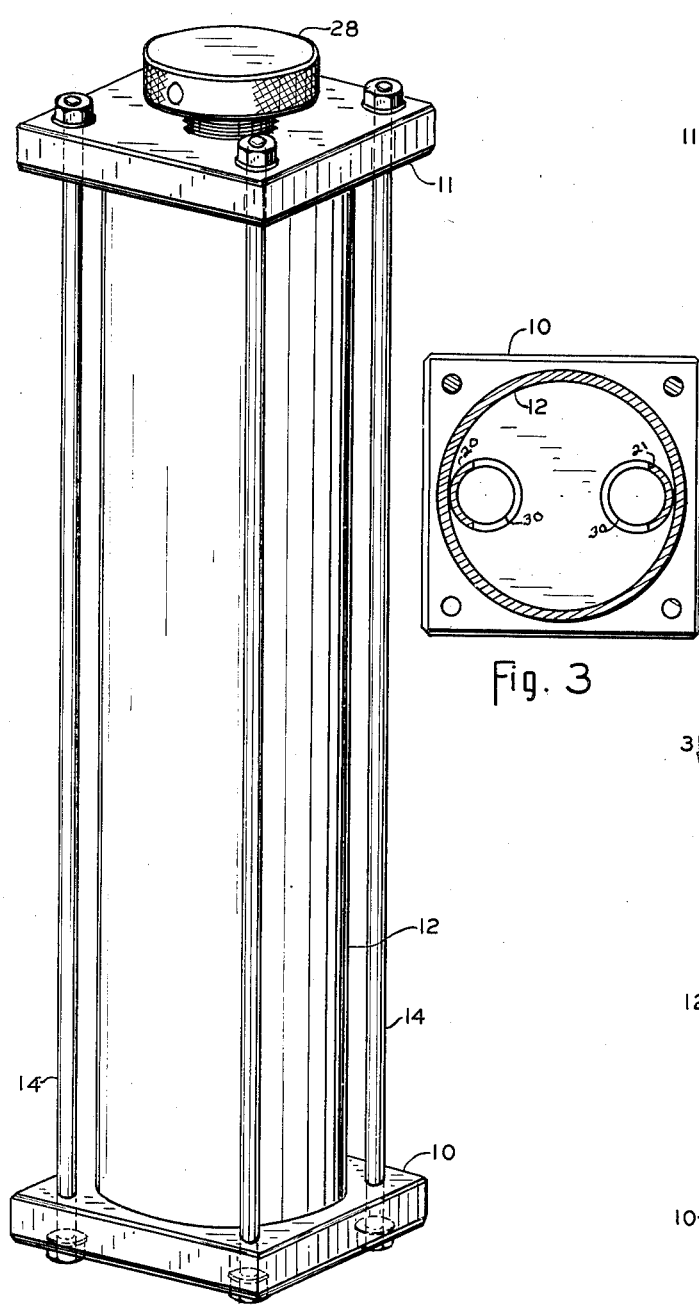
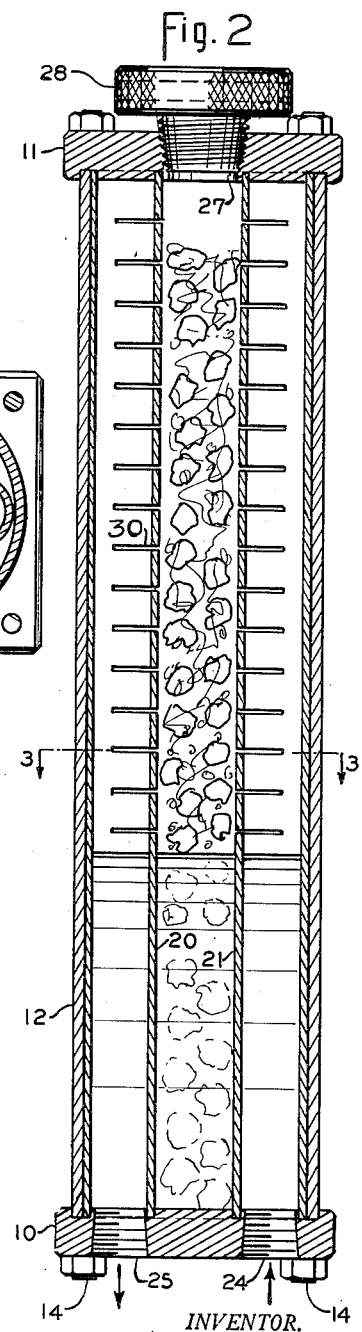
Fig. 1  Fig. 2  Fig. 3
INVENTOR.
HERBERT J. ATKINSON.
BY Charles T. Hawley
ATT'Y.

Patented Apr. 28, 1953

2,636,812

UNITED STATES PATENT OFFICE 2,636,812

FEEDER FOR SOLID AND LIQUID CONSTITUENTS

Herbert J. Atkinson, Sudbury, Mass.

Application July 12, 1952, Serial No. 298,640

1 Claim. (Cl. 23—267)

This invention relates to a feeder in which an aqueous solution may be continuously formed by exposing a stream of water to a chemical, as sodium silicate, which is in both solid and liquid form.

The entire feeder is preferably to be first filled with the desired material in crystalline form and the spaces between the crystals in the lower part of the feeder are then to be filled with the same material in liquid form.

It is the object of this invention to provide an improved feeder for the general purpose above indicated.

A preferred form of the invention is shown in the drawings, in which

Fig. 1 is a perspective view of the improved feeder;

Fig. 2 is a sectional front elevation thereof; and

Fig. 3 is a sectional plan view, taken along the line 3—3 in Fig. 2.

Referring to the drawings, the improved feeder is shown as comprising a base 10, a top 11 and a cylindrical body portion 12.

The base 10 and top 12 are grooved to receive the ends of the body 12 and these parts are held firmly assembled by a plurality of bolts 14.

Two inner pipes or conduits 20 and 21 are provided and are similarly secured between the parts 10 and 11 by the bolts 14.

A threaded inlet opening 24 and a corresponding outlet opening 25 communicates with the interiors of the pipes 20 and 21 respectively. A filler opening 27 in the top 11 is normally closed by a plug 28.

A series of narrow and partial slots 30 are provided in the middle and upper portions only of the pipes 20 and 21 but not in the lower portions.

The usual supply and distribution pipes will be connected in the openings 24 and 25, and the parts 10, 11, 12, 20 and 21 may be cemented in assembled relation if desired. All parts may be of plastic material.

In using the feeder, the entire interior of the feeder is first filled with crystals, as sodium silicate, through the filler opening 27, and a liquid form of the same chemical is then added between the crystals to a point just below the lowest slots 30.

Water then enters the feeder through the opening 24 and pipe 21 and flows through the mass of crystals from the slots 30 in the pipe 21 to the corresponding slots in the pipe 20. Some of the water also flows over the upper surface of the liquid chemical, which liquid chemical passes into solution more rapidly than do the solid crystals.

The crystals immersed in the liquid are gradually dissolved and other crystals descend and replace them, so that the strength of the treating chemical is maintained for a relatively long time.

It is of particular importance that the lower parts of the supply and distribution pipes be imperforate, as otherwise the liquid chemical will be immediately washed away.

Having thus described my invention and the advantages thereof, I do not wish to be limited to the details herein disclosed, otherwise than as set forth in the claim, but what I claim is:

A feeder for solid and liquid constituents which comprises an elongated vertical container having a base and a top, said base having a supply inlet opening and a distribution outlet opening and said top having a filler opening, vertical pipes in said container which are connected to said supply and distribution openings and which are closed at their upper ends, and said pipes having a series of spaced slots in their side walls opening into said container and located in the middle and upper portions only of said pipes but leaving the lower portions of said pipes imperforate, whereby circulation can take place between said supply inlet and said distribution outlet in the upper and middle portions only of said feeder.

HERBERT J. ATKINSON.

No references cited.